United States Patent [19]

Duckwall et al.

[11] Patent Number: 5,398,942
[45] Date of Patent: Mar. 21, 1995

[54] ANNULAR LUBRICANT SEAL ASSEMBLY
[75] Inventors: Brian N. Duckwall, Norman, Okla.;
James A. Mansfield, Nashville, Tenn.
[73] Assignee: Dana Corporation, Toledo, Ohio
[21] Appl. No.: 939,132
[22] Filed: Sep. 2, 1992
[51] Int. Cl.[6] .............................................. F16J 15/32
[52] U.S. Cl. ...................................... 277/38; 277/37; 277/153; 277/50
[58] Field of Search ..................... 277/37, 38, 47, 50, 277/51, 152, 153

[56] References Cited

U.S. PATENT DOCUMENTS

| Re. 30,223 | 3/1980 | Prescott et al. . | |
|---|---|---|---|
| 2,695,801 | 11/1954 | Kosatka . | |
| 3,341,265 | 9/1967 | Paterson . | |
| 3,356,376 | 12/1967 | Bradfute et al. . | |
| 3,510,138 | 5/1970 | Bowen et al. ................ | 277/153 X |
| 3,614,183 | 10/1971 | Berens et al. . | |
| 3,682,488 | 8/1972 | Matsushima . | |
| 3,746,351 | 7/1973 | Tucker, Jr. ................... | 277/153 |
| 4,037,848 | 7/1977 | Prescott et al. . | |
| 4,037,849 | 7/1977 | Thumm . | |
| 4,083,567 | 4/1978 | Thumm . | |
| 4,208,057 | 6/1980 | Messenger . | |
| 4,243,232 | 1/1981 | Repella . | |
| 4,252,329 | 2/1981 | Messenger . | |
| 4,274,641 | 6/1981 | Cather, Jr. . | |
| 4,283,063 | 11/1981 | Prescott . | |
| 4,285,526 | 8/1981 | Klinteberg et al. . | |
| 4,426,094 | 1/1984 | Antonini ........................ | 277/50 X |
| 4,428,630 | 1/1984 | Folger et al. . | |
| 4,432,557 | 2/1984 | Drucktenhengst . | |
| 4,448,426 | 5/1984 | Jackowski et al. . | |
| 4,508,020 | 4/1985 | Szcupak . | |
| 4,527,673 | 7/1985 | Szcupak . | |
| 4,531,748 | 7/1985 | Jackowski ..................... | 277/50 X |
| 4,550,920 | 11/1985 | Matsushima . | |
| 4,553,763 | 11/1985 | Ehrmann . | |
| 4,575,104 | 3/1986 | Nagasawa et al. . | |
| 4,588,195 | 5/1986 | Antonini et al. . | |
| 4,696,479 | 9/1987 | Karcher ........................ | 277/38 X |
| 4,721,312 | 1/1988 | Hornberger . | |
| 4,844,484 | 7/1989 | Antonini et al. . | |
| 4,856,794 | 8/1989 | Boyers et al. . | |
| 4,981,303 | 1/1991 | Matsushima et al. . | |
| 5,004,248 | 4/1991 | Messenger et al. . | |
| 5,015,001 | 5/1991 | Jay . | |
| 5,024,449 | 6/1991 | Otto . | |

FOREIGN PATENT DOCUMENTS 590874  7/1947  United Kingdom ................. 277/47

Primary Examiner—Scott W. Cummings
Attorney, Agent, or Firm—MacMillan, Sobanski & Todd

[57] ABSTRACT

An annular lubricant seal assembly for an annular lubricant seal assembly for providing a seal between a shaft extending through a bore formed in a housing and the housing, wherein the shaft and the housing are rotatable relative to one another. The seal assembly includes an annular outer case, which is press fit into the bore, and an annular inner case, which is mounted on the shaft. Portions of the outer case extend adjacent to, but are spaced apart from portions of the inner case. An elastomeric seal member is secured to the outer case. Flexible lips formed on the seal member engage both axially and radially extending portions of the inner case disposed adjacent to the outer case. As a result, the seal member is capable of providing a secure seal against the shaft, even when the shaft moves axially or radially relative to the housing during use.

12 Claims, 1 Drawing Sheet

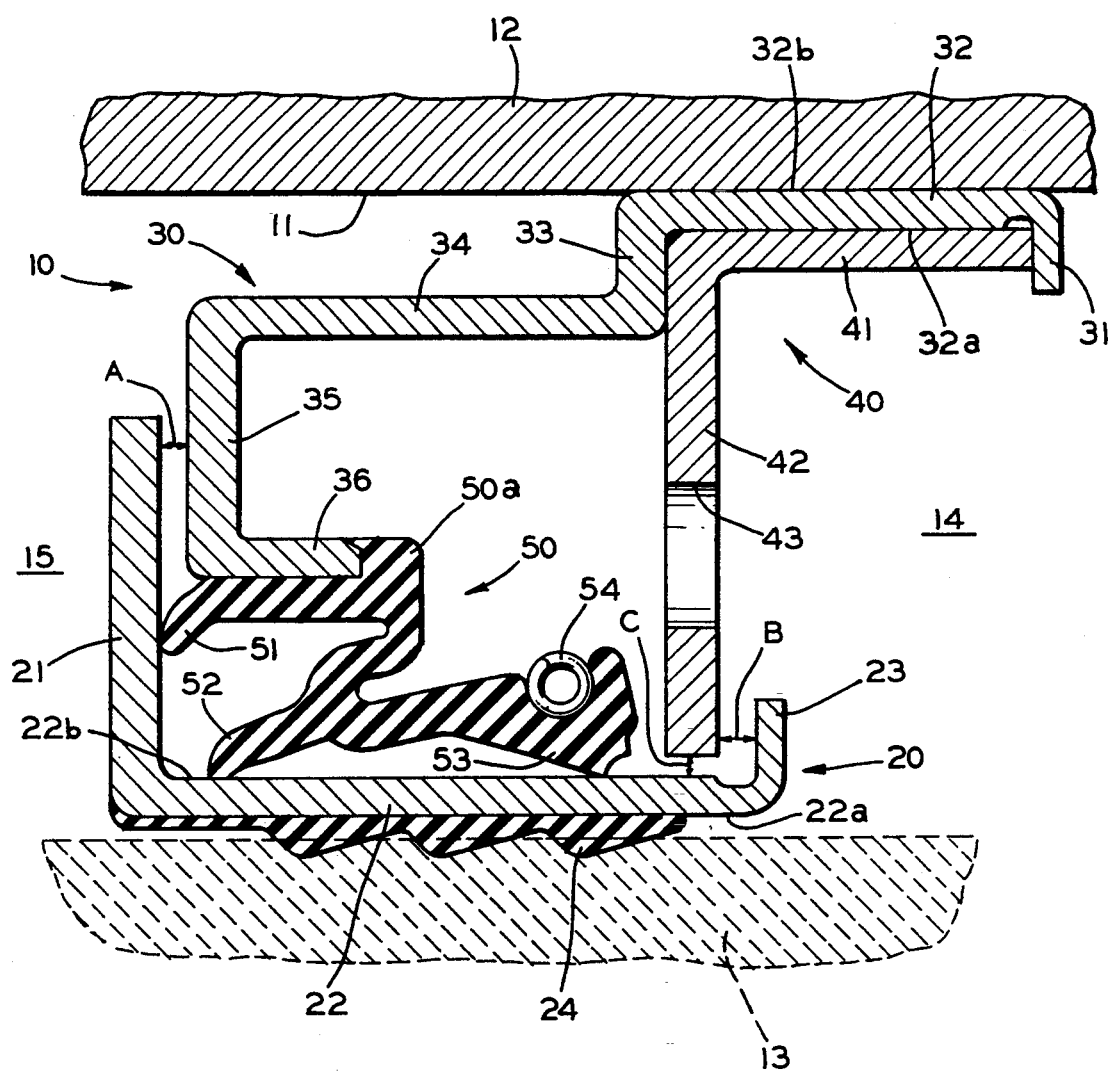

ANNULAR LUBRICANT SEAL ASSEMBLY

BACKGROUND OF THE INVENTION

This invention relates in general to lubricant seals and in particular to an improved structure for an annular lubricant seal assembly for providing a seal between a shaft extending through a bore formed in a housing and the housing, wherein the shaft and the housing are rotatable relative to one another.

Annular lubricant seal assemblies are typically used in vehicle axle assemblies for providing a seal between a non-rotating axle spindle or shaft and a rotatable wheel hub or housing disposed about the shaft. Lubricant seal assemblies of this type are provided to both to retain lubricant within the wheel hub and to prevent dirt and other contaminants from entering therein. Known lubricant seal assemblies typically include an annular metallic outer case which is press fit within a bore formed in the wheel hub. An annular inner case is mounted concentrically within the outer case. The axle spindle extends through the inner case, which is free to rotate therewith relative to the outer case. A sealing element formed of a resilent material is typically disposed between the outer case and the inner case. This sealing element includes one or more flexible lips which prevent the escape of lubricant from the housing. The sealing element may also include a supplemental flexible lip to prevent contaminants from entering within the wheel hub.

During operation of the vehicle, the wheel hub not only rotates relative to the axle spindle, but also frequently moves both axially and radially relative thereto. Such axial and radial movement can undesirably distort the shape of the sealing element, resulting in a loss of the seal formed by the flexible lips. Also, repetitious axial and radial movements over a period of time can damage the flexible lips. As a result, lubricant may escape from the wheel hub, and dirt and other contaminants may enter therein. Thus, it would be desirable to provide an improved structure for an annular lubricant seal assembly which can accommodate such relative axial and radial movements, while providing a reliable seal between relatively rotatable components.

SUMMARY OF THE INVENTION

This invention relates to an improved structure for an annular lubricant seal assembly for an annular lubricant seal assembly for providing a seal between a shaft extending through a bore formed in a housing and the housing, wherein the shaft and the housing are rotatable relative to one another. The seal assembly includes an annular outer case, which is press fit into the bore, and an annular inner case, which is mounted on the shaft. Portions of the outer case extend adjacent to, but are spaced apart from portions of the inner case. An elastomeric seal member is secured to the outer case. Flexible lips formed on the seal member engage both axially and radially extending portions of the inner case disposed adjacent to the outer case. As a result, the seal member is capable of providing a secure seal against the shaft, even when the shaft moves axially or radially relative to the housing during use.

Various objects and advantages of this invention will become apparent to those skilled in the art from the following detailed description of the preferred embodiment, when read in light of the accompanying drawing.

BRIEF DESCRIPTION OF THE DRAWING

The sole figure is a sectional elevational view of a portion of an annular lubricant seal assembly in accordance with this invention.

DETAILED DESCRIPTION OF THE PREFERRED EMBODIMENT

Referring now to the drawing, there is illustrated a portion of an annular lubricant seal assembly, indicated generally at 10, in accordance with this invention. The seal assembly 10 is disposed within a bore 11 formed through a housing 12. The housing 12 may, for example, be a rotatable wheel hub for a vehicle. A shaft, indicated in dotted lines at 13, extends through the seal assembly 10. The shaft 13 may, for example, be an axle spindle for a vehicle which rotatably supports the wheel hub 12 thereon. Typically, the housing 12 also moves axially and radially relative to the shaft 13 during operation, although by relatively small amounts. As will be explained in detail below, the seal assembly 10 functions to retain lubricant within the housing 12, while permitting relative rotational, axial, and radial movement of the housing 12 relative to the shaft 13. In the illustrated embodiment, the space 14 indicates the lubricant side of the seal assembly 10, while the space 15 indicates the external environment.

The seal assembly 10 includes an annular metallic inner case, indicated generally at 20. The inner case 20 is generally U-shaped in cross section, having a first radially extending leg portion 21, a second leg portion 22 extending axially from the innermost end of the first leg portion 21, and a third leg portion 23 extending radially outwardly from the end of the second leg portion 22 opposite the first leg portion 21. The second portion 22 has an inner circumferential surface 22a and an outer circumferential surface 22b. The inner circumferential surface 22a has a layer 24 of resilient material, such as nitrile rubber, adhered thereto by conventional means.

The resilient layer 24 may be formed having a convoluted inner surface which, in the illustrated embodiment, may be generally ramp-shaped in cross section. Portions of the convoluted inner surface define an inner diameter which is smaller than the outer diameter of the shaft 13. Thus, those portions of the resilient layer 24 are compressed when the shaft 13 is inserted through the inner case 20. As a result, the inner case 20 is secured to the shaft 13 during operation. The convoluted portions of the resilient layer 24 are formed having the ramp-like configuration to facilitate installation of the inner case 20 onto the shaft 13 in one axial direction, yet resist removal thereof in the opposite axial direction.

The seal assembly 10 also includes an annular metallic outer case, indicated generally at 30. As shown in the drawing, the outer case 30 has a convoluted cross sectional shape defined by six leg portions. A first leg portion 31 of the outer case 30 extends radially. A second leg portion 32 of the outer case extends axially from the outermost end of the first leg portion 31. The second leg portion 32 has an inner circumferential surface 32a and an outer circumferential surface 32b. The outer circumferential surface 32b of the second leg portion 32 is press fit into the bore 11 of the housing 12. Thus, unlike the inner case 20 which is mounted on the shaft 13, the outer case 30 is mounted on the housing 12 during operation.

A third leg portion 33 of the outer case 30 extends radially outwardly from the end of the second leg portion opposite the first leg portion 31. Thus, the first leg portion 31 and the third leg portion 33 of the outer case 30 define an axially extending space therebetween, the purpose of which will be explained below. A fourth leg portion 34 extends axially from the innermost end of the third leg portion 33. A fifth leg portion 35 extends radially inwardly from the end of the fourth leg portion 34 opposite the third leg portion 33. Finally, a sixth leg portion 36 extends axially from the innermost end of the fifth leg portion 35.

As shown in the drawing, the outer case 30 is disposed generally concentrically about the inner case 20. A portion of the fifth leg portion 35 of the outer case 30 extends adjacent to, but is spaced apart from, the first leg portion 21 of the inner case 20. These adjacent portions of the inner case 20 and the outer case 30 define an axially extending space therebetween, which is identified as "A" in the drawing. The purpose of this axially extending space "A" will be explained below.

The seal assembly 10 further includes an annular metallic shield, indicated generally at 40. The shield 40 has an inverted-L cross sectional shape, having an axially extending leg portion 41 and a radially extending leg portion 42. The axially extending leg portion 41 is disposed adjacent to the second leg portion 32 of the outer case 30, while a portion of the radially extending leg portion 42 is disposed adjacent to the third leg portion 33. In practice, the first leg portion 31 of the outer case 30 is initially formed parallel with the second leg portion 32. The axially and radially extending portions 41 and 42 of the shield 40 are disposed adjacent the second and third leg portions 32 and 33, respectively. Then, the first leg portion 31 of the outer case 30 is rolled radially inwardly as shown in the drawing. As a result, the shield 40 is securely engaged to the outer case 30. One or more apertures 43 are formed through the radially extending leg portion 42 of the shield 40. The purpose of these apertures 43 will be explained below.

Thus, it can be seen that the shield 40 is supported concentrically within the outer case 30. As shown in the drawing, a portion of the radially extending leg portion 42 of the shield 40 extends adjacent to, but is spaced apart from, the third leg portion 23 of the inner case 20. These adjacent portions of the inner case 20 and the shield 40 define an axially extending space therebetween, which is identified as "B" in the drawing. The purpose of this axially extending space "B" will be explained below. Also, the innermost end of the radially extending leg portion 42 is disposed adjacent to, but is spaced apart from, the inner circumferential surface 22a of the second leg portion 22 of the inner case. These adjacent portions of the inner case 20 and the shield 40 define a radially extending space therebetween, which is identified as "C" in the drawing. The purpose of this radially extending space "C" will be explained below.

Lastly, the seal assembly 10 includes an annular seal member, indicated generally at 50. The seal member 50 is formed from a resilient elastomeric material, such as nitrile rubber. The seal member 50 has a base portion 50a which is bonded to the sixth leg portion 36 of the outer case 30. A first flexible lip 51 extends generally axially from the base portion 50a into sealing engagement with the first leg portion 21 of the inner case 20. A second flexible lip 52 extends generally radially from the base portion 50a into sealing engagement with the second leg portion 22 of the inner case 20, adjacent to the first leg portion 21. A third flexible lip 53 also extends generally radially from the base portion 50a into sealing engagement with the second leg portion 22 of the inner case 20, but adjacent to the third leg portion 23. A conventional garter spring 54 extends about the inner portion of the third flexible lip 53, urging it into sealing engagement with the second leg portion 22 of the inner case 20.

In operation, the seal assembly 10 is installed in the housing by press fitting the outer case 30 into the bore 11. Then, the shaft 13 is inserted through the inner case 20. During normal operation, the housing 12 and the shaft 13 rotate generally concentrically relative to one another and, therefore, relative to the seal assembly 10. However, as mentioned above, the housing 12 may also move both axially and radially relative to the shaft 13. Thus, the outer case 30, the shield 40, and the seal member 50 not only rotates relative to the inner case 20, but also move axially and radially relative thereto. The clearances "A", "B" and "C" discussed above are provided to accommodate such relative movement of the inner case 20. The clearance "A" also restricts the entry of dirt and other contaminants into the interior of the seal assembly 10, thus protecting the seal member 50 therefrom.

Throughout such relative axial and radial movements of the housing 12 and the shaft 13, the flexible lips 51, 52, and 53 of the seal member 50 engage the leg portions 21 and 22 of the inner case 20 to provide a seal therebetween. As discussed above, the first flexible lip 51 resiliently engages the first radially extending leg portion 21 of the inner case 20. The first flexible lip 51 functions as the primary seal to prevent dirt and other contaminants from entering within the seal assembly 10. Because of its flexibility, the first flexible lip 51 maintains contact with the first leg portion 21 of the inner case 20 when the shaft 13 and the inner case 20 move axially relative to the housing 12 and the outer case 30.

As also discussed above, the second and third flexible lips 52 and 53 resiliently engage axially extending second leg portion 22 of the inner case. The second flexible lip 52 functions as a secondary seal, also to prevent dirt and other contaminants from entering within the seal assembly 10. The third flexible lip 53 functions as the oil seal, preventing lubricant from draining from the interior space 14 to the exterior space 15. Because of their flexibility, the second and third flexible lips 52 and 53 maintain contact with the second leg portion 22 of the inner case 20 when the shaft 13 and the inner case 20 move radially relative to the housing 12 and the outer case 30.

As discussed above, clearances "A" "B" and "C" are provided between portions of the inner case 20, the outer case 30, and the shield 40. These clearances are designed to accommodate the axial and radial movement of the housing 12 (and the outer case 30 and the shield 40 mounted thereon) relative to the shaft 13 (and the inner case 20 mounted thereon). The apertures 43 are provided to permit lubricant to flow freely from the interior space 14 to the inside area of the seal assembly 10. This prevents any suction or vacuum effect from occurring in the seal assembly 10 as a result of continuous reciprocating movement of the inner case 20 relative to the outer case 30 and the shield 40.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A seal assembly for providing a seal between a shaft extending through a bore formed in a housing and the housing, the seal assembly comprising:

an inner case adapted to be mounted on the shaft, said inner case including an axially extending leg portion and a radially extending leg portion;

an outer case adapted to be mounted on the housing within the bore and about said inner case, said outer case including first and second radially extending leg portions;

a shield including an axially extending leg portion and a radially extending leg portion, said axially extending leg portion being engaged by said first and second radially extending leg portions of said outer case so as to secure said shield thereto; and a resilent seal member attached to said outer case at a first radial location relative to said inner case and disposed between said radially extending leg portion of said inner case and said radially extending leg portion of said shield, said seal member engaging both said axially extending leg portion of said inner case and said radially extending leg portion of said inner case at second and third radial locations, respectively, relative to said inner case to provide a seal between the shaft and the housing, said first radial location being radially outward from both said second and third radial locations.

2. The seal assembly defined in claim 1 wherein a portion of said radially extending leg portion of said inner case extends adjacent to, but is spaced apart from, a portion of said outer case.

3. The seal assembly defined in claim 1 wherein said inner case further includes a second radially extending leg portion, a portion of said second radially extending leg portion of said inner case extending adjacent to, but spaced apart from, a portion of said radially extending leg portion of said shield.

4. The seal assembly defined in claim 1 wherein said shield includes an aperture formed through said radially extending leg portion.

5. The seal assembly defined in claim 1 wherein said radially extending leg portion of said shield terminates adjacent to, but spaced apart from, said axially extending leg of said inner case.

6. The seal assembly defined in claim 1 wherein said inner case has a layer of resilient material adhered to an inner circumferential surface of said axially extending leg portion, said layer adapted to mount said inner case on the shaft.

7. The seal assembly defined in claim 6 wherein said layer has a convoluted inner surface.

8. The seal assembly defined in claim 7 wherein said convoluted inner surface is generally ramp-shaped in cross section.

9. The seal assembly defined in claim 1 wherein said seal member includes a first flexible lip which resiliently engages said radially extending leg of said inner case.

10. The seal assembly defined in claim 9 wherein said seal member further includes a second flexible lip which resiliently engages said axially extending leg of said inner case.

11. The seal assembly defined in claim 10 wherein said seal member further includes a third flexible lip which also resiliently engages said axially extending leg of said inner case.

12. The seal assembly defined in claim 11 wherein said seal member further includes a garter spring disposed about said third flexible lip for urging it to resiliently engage said axially extending leg of said inner case.

* * * * *